US011872783B2

(12) United States Patent
Bessac et al.

(10) Patent No.: US 11,872,783 B2
(45) Date of Patent: Jan. 16, 2024

(54) DEVICE FOR CUTTING A PROFILE OF A TIRE TREAD IN A RUBBER PROFILED ELEMENT, AND CUTTING METHOD USING SUCH A DEVICE

(71) Applicant: COMPAGNIE GENERALE DES ETABLISSEMENTS MICHELIN, Clermont-Ferrand (FR)

(72) Inventors: Christophe Bessac, Clermont-Ferrand (FR); Clément Nagode, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1433 days.

(21) Appl. No.: 16/310,017

(22) PCT Filed: Jun. 12, 2017

(86) PCT No.: PCT/FR2017/051496
§ 371 (c)(1),
(2) Date: Dec. 14, 2018

(87) PCT Pub. No.: WO2017/216461
PCT Pub. Date: Dec. 21, 2017

(65) Prior Publication Data
US 2019/0329510 A1  Oct. 31, 2019

(30) Foreign Application Priority Data
Jun. 14, 2016 (FR) ........................................ 1655490

(51) Int. Cl.
*B29D 30/68* (2006.01)
*B29D 30/46* (2006.01)
(Continued)

(52) U.S. Cl.
CPC ............... *B29D 30/68* (2013.01); *B26D 1/45* (2013.01); *B29D 30/46* (2013.01); *B29D 30/54* (2013.01);
(Continued)

(58) Field of Classification Search
CPC .......... B26D 3/003; B26D 3/005; B26D 3/06; B26D 3/065; B26D 7/086; B29D 30/06;
(Continued)

(56) References Cited

U.S. PATENT DOCUMENTS 2,603,290 A * 7/1952 Lindemann ............. B29C 37/02
157/13
3,502,131 A * 3/1970 Rawls ..................... B29D 30/68
157/13
(Continued)

FOREIGN PATENT DOCUMENTS

WO   WO-2016020781 A1 *   2/2016   ............. B26D 3/003

OTHER PUBLICATIONS

International Search Report dated Sep. 26, 2017, in corresponding PCT/FR2017/051496 (4 pages).
(Continued)

*Primary Examiner* — Lee D Wilson
*Assistant Examiner* — Alberto Saenz
(74) *Attorney, Agent, or Firm* — VENABLE LLP

(57) ABSTRACT

A device for cutting the profile of a tyre tread (B) in a profiled element made of a raw rubber mixture comprises a frame (1) supporting a cutting assembly (2) and travel means (3) which make it possible for said profiled element (B) to be cut to travel in front of said cutting assembly (2), said cutting assembly (2) comprising at least one cutter (4) for cutting a longitudinal groove (S) in the outer face of said profiled element (B) and means (5) for inducing vibration in
(Continued)

said cutter (4) in a transverse direction perpendicular to the direction of travel (X-X') of said profiled element.

15 Claims, 7 Drawing Sheets

(51) Int. Cl.
*B29D 30/44* (2006.01)
*B29D 30/54* (2006.01)
*B26D 1/45* (2006.01)

(52) U.S. Cl.
CPC .............. *B29D 2030/4425* (2013.01); *B29D 2030/685* (2013.01)

(58) Field of Classification Search
CPC ........ B29D 30/46; B29D 30/54; B29D 30/68; B29D 2030/4425; B65H 35/02
USPC .... 157/13; 83/375, 875, 876, 877, 878, 951; 30/280, 281, 294, 314, 317
See application file for complete search history.

(56) References Cited

U.S. PATENT DOCUMENTS

| | | | | |
|---|---|---|---|---|
| 3,808,076 | A * | 4/1974 | Barwell | ................ B29D 30/62 264/177.17 |
| 4,206,798 | A | 6/1980 | Ray et al. | |
| 2013/0236665 | A1* | 9/2013 | Bessac | ................ B29C 48/156 156/244.11 |

OTHER PUBLICATIONS

Search Report dated Feb. 6, 2017, in corresponding FR 1655490 (2 pages).

* cited by examiner

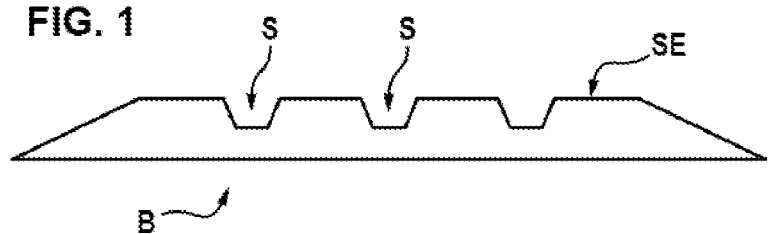
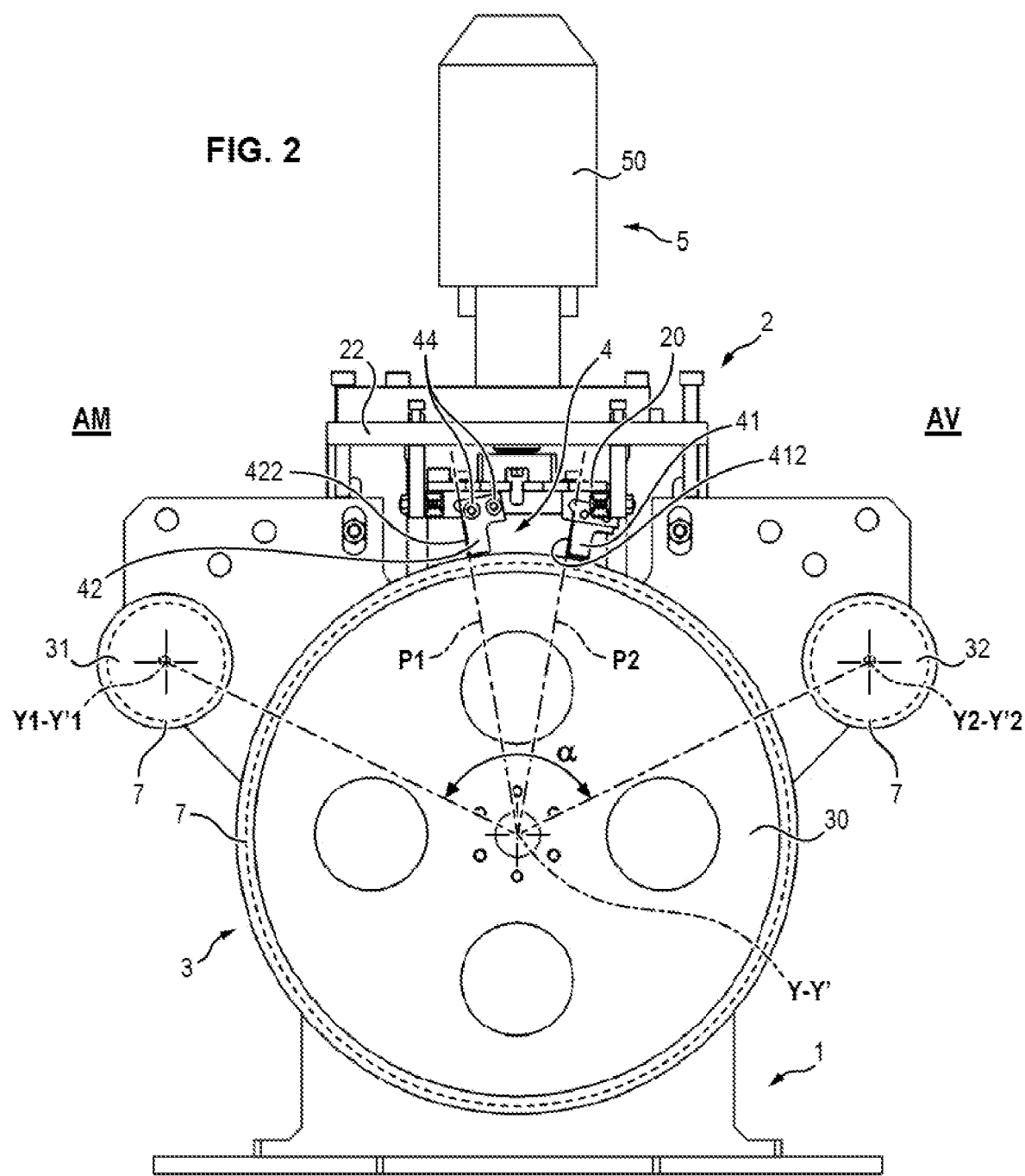

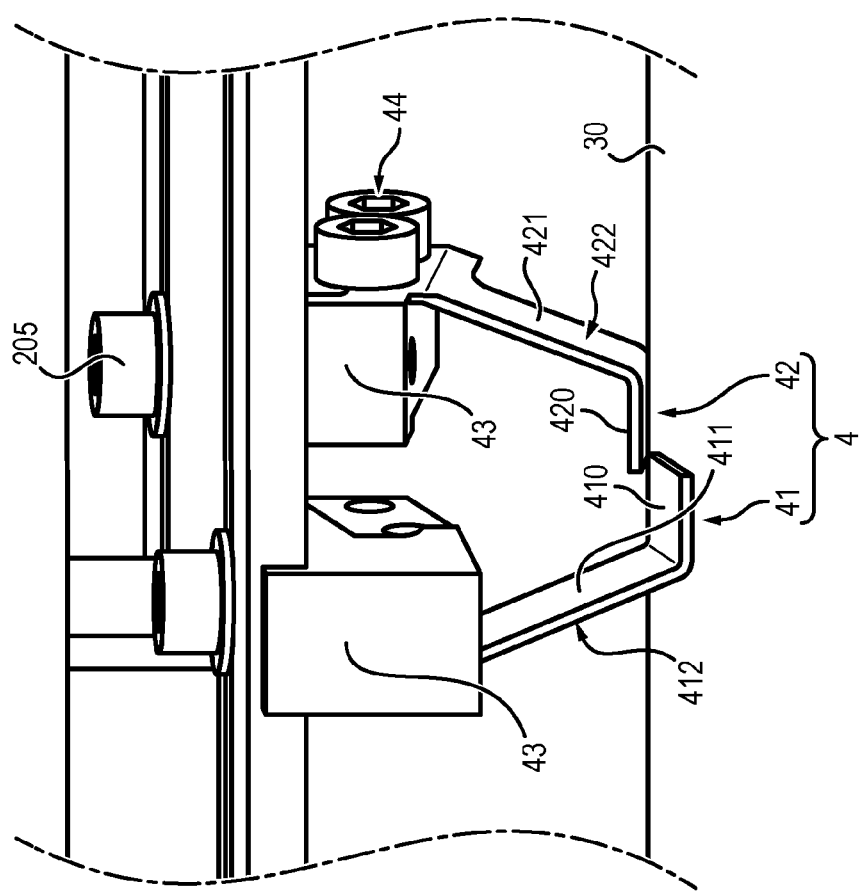

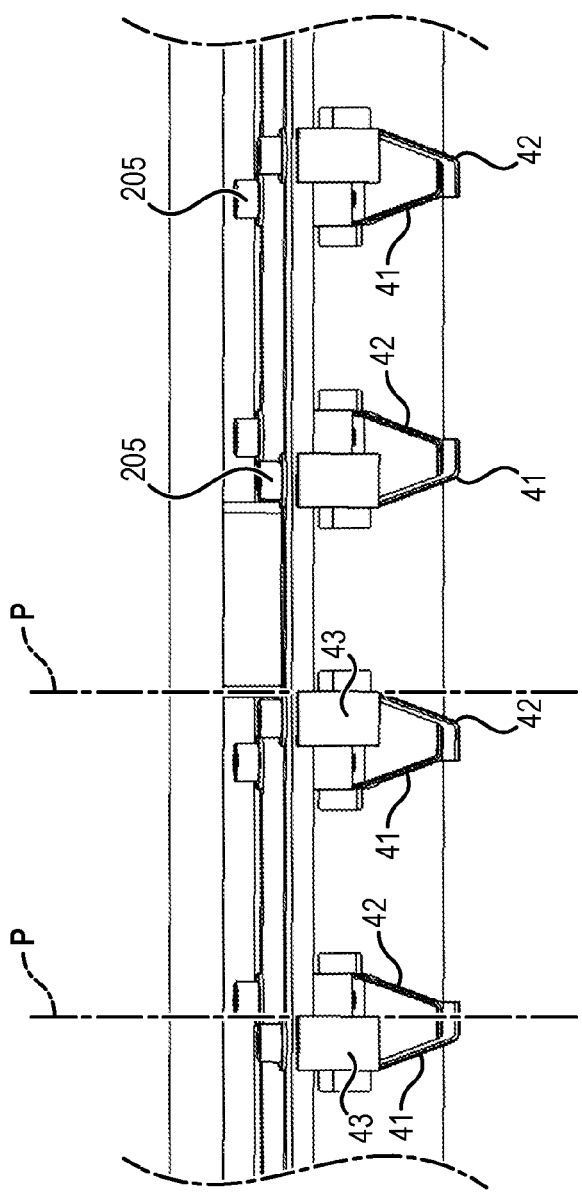

FIG. 7A
FIG. 7B
FIG. 7C
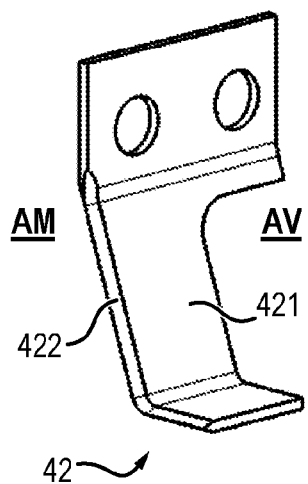
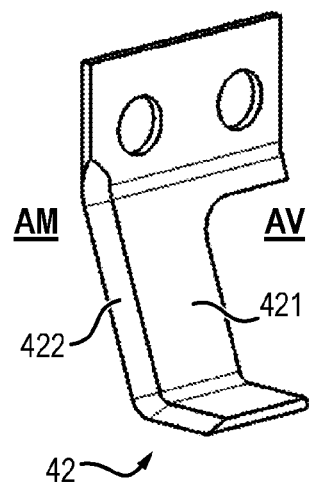
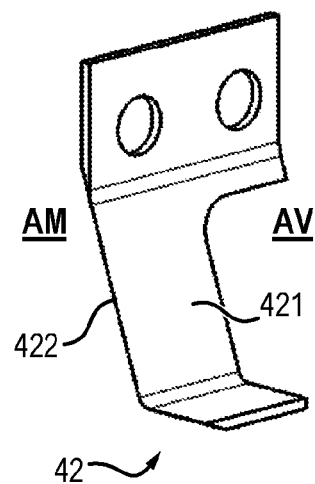
FIG. 8
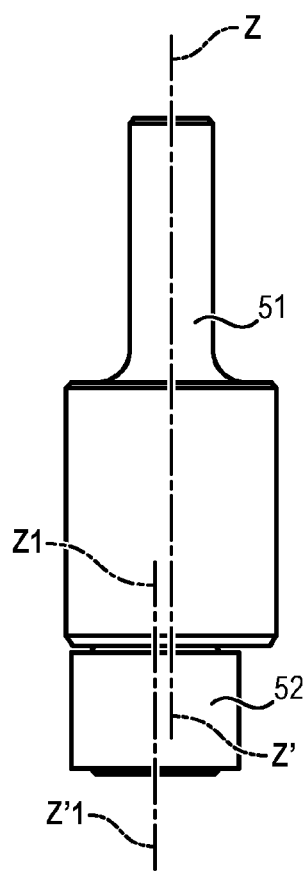

DEVICE FOR CUTTING A PROFILE OF A TIRE TREAD IN A RUBBER PROFILED ELEMENT, AND CUTTING METHOD USING SUCH A DEVICE

GENERAL TECHNICAL FIELD

The invention is situated in the field of the manufacture of tyres for vehicles.

The present invention relates more specifically to a device for cutting the profile of a tyre tread in a profiled element made of a raw rubber mixture. More specifically, the cutting of the profile of a tyre tread in the profiled element takes place before cutting this profiled element into various sections intended to be affixed to various blanks of tyres, in order to form the treads of the tyres obtained from these blanks.

The invention also relates to a method for cutting the profile of a tyre tread in a profiled element made of a raw rubber mixture with the aid of such a device.

PRIOR ART

A tyre for the wheel of a vehicle generally comprises a plurality of superposed rubber plies and also a metal structure or textile-fibre structure constituting a carcass for reinforcing the structure of the tyre.

This tyre also comprises a tread. This tread envelops the aforementioned carcass and plies and it is intended to come into contact with the ground. During the assembly of the tyre blank, that is to say of the tyre before curing, the tyre tread is fabricated from a section cut in a profiled element made from a raw rubber mixture, also referred to as tyre tread profiled element.

FIG. 1, appended, schematically represents the cross section of an exemplary embodiment of such a tyre tread profiled element.

The tyre tread profiled element B has a trapezoidal cross section, which is much wider than it is high, and it incorporates a plurality of longitudinal grooves S, that is to say furrows which extend along its entire length and over a certain depth from its outer surface SE. The outer surface is that which is intended to come into contact with the road.

This tyre tread profiled element B takes the form of a strip of a raw rubber mixture, that is to say which has not yet been cured.

At the present time, the tyre tread profiled element B is obtained by extrusion. Its final extrusion profile (that is to say the shape of the contour of this profiled element and in particular the shape of the grooves S) is given by an extrusion blade situated at the exit of the extruder, this blade having a substantially identical cut to the profile to be extruded but not rigorously identical thereto, since account should be taken of the fact that the rubber mixture or gum swells slightly when it is in the hot state in the extruder and then immediately retracts upon its exit therefrom.

During the manufacture of tyres, various tyre tread profiled elements B with various shapes of profiles must be manufactured. Therefore, it is necessary to design a new extrusion blade to be arranged at the exit of the extruder for each new profile of tyre tread profiled element to be manufactured.

In addition, the composition of the rubber mixture of the tyre tread profiled element has an impact on the geometry of the extrusion blade. It results from the foregoing that a new extrusion blade must be designed and machined as soon as the composition of the rubber mixture is modified.

Finally, and in spite of the currently available modelling and simulation means, it is generally necessary to produce a plurality of prototypes of extrusion blades to obtain the desired final profile of the tyre tread profiled element, with the permitted tolerances, in particular because of the swelling and shrinkage phenomena of the rubber at the time of its extrusion.

Document U.S. Pat. No. 3,808,076 discloses a device for retreading tyres comprising a device intended to remove the worn tyre tread located on the outer face of this tyre.

In addition, this device comprises an extrusion die which makes it possible to directly extrude a tyre tread profiled element section on the tyre from which the worn outer surface has been previously removed as described above. This die comprises fingers which make it possible to form grooves in the extruded material and means which make it possible to oscillate these fingers, perpendicularly to the direction of movement of the tyre, so as to form zigzag grooves in the tyre tread profiled element section during its formation.

Moreover, this document also describes the possibility of completely withdrawing these fingers so as to form a smooth tyre, without grooves, and of adding to the device, downstream of the extrusion die, cutters for cutting grooves.

However, this document absolutely does not mention that such cutters could be provided with vibration-inducing means.

Finally, such a device does not comprise means allowing the tyre tread profiled element to travel before its application to the outer face of the tyre, that is to say when it is still in the form of an extruded profiled element independent of the rest of the tyre.

SUMMARY OF THE INVENTION

The aim of the invention is to solve the aforementioned disadvantages of the prior art.

A particular objective of the invention is to avoid having to develop a new extrusion blade for each new tyre tread profile and/or for each new composition of the rubber mixture, and another objective thereof is to eliminate the various steps of developing these extrusion blades.

An additional objective of the invention is also to propose a device which makes it possible to pass from one tyre tread profile to another without the need to stop the extrusion machine. This is particularly important since stopping an extrusion machine generally means that it is necessary to carry out complete cleaning of the machine and its extrusion nozzles before being able to restart it, in order to remove all the rubber residues which could have cooled inside this extrusion machine.

Accordingly, the invention relates to a device for cutting the profile of a tyre tread in a tyre tread profiled element made of a raw rubber mixture, and before cutting this profiled element into various sections intended for the fabrication of tyre treads of various tyres.

According to the invention, this device comprises a frame supporting a cutting assembly and travel means making it possible for said profiled element to be cut to travel in front of said cutting assembly, said cutting assembly comprising at least one cutter for cutting a longitudinal groove in the outer face of said profiled element and means for inducing vibration in said cutter in a transverse direction perpendicular to the direction of travel of said profiled element.

By virtue of these features of the invention, the profile of the tyre tread is cut after leaving the extruder with the aid of the cutters of the cutting assembly. The extrusion blade placed at the exit of the extruder is then generic and makes it possible to form a strip of rubber mixture of trapezoidal, and possibly rectangular, cross section. The various tyre tread profiles are then obtained by simply modifying the number, the shape or the position of the cutters of the cutting device. The number of grooves, their positions, widths and depths are thus adjusted. This profile can then be modified as desired, either manually or automatically.

The steps of developing the extrusion blade prototypes are also eliminated.

Finally, it is no longer necessary to stop the extruder when it is desired to change the tyre tread profile; all that is required is to modify the position of the cutters while the rubber mixture continues to exit from the extruder and to scrap or recycle the transitional region of the tyre tread.

According to other advantageous and non-limiting features of the invention, taken alone or in combination:

said cutting assembly comprises a means for individual adjustment of the height position of a cutter and/or a means for adjustment of the height position of all the cutters when there is a plurality thereof and/or means for adjustment of the transverse position of said cutter(s) with respect to said direction of travel of said profiled element;

the cutting assembly comprises a support plate below which said cutter(s) is or are fixed, this support plate being arranged horizontally or in a tangent plane opposite the upper face of the profiled element in such a way that the cutter(s) can cut a longitudinal groove therein, and being mounted at its two lateral ends on two vertical lateral spring blades, each spring blade having a lower end fastened to said frame and an upper end fastened to said support plate, in such a way that said support plate can move back and forth in a transverse direction perpendicular to the direction of travel of said profiled element, under the action of said vibration-inducing means;

the support plate has on its upper face an oblong cavity extending in the direction of travel of said profiled element, said vibration-inducing means comprise a fixed supporting plate, secured to said frame, mounted above said support plate and supporting an actuator, said actuator comprises a motor which drives an eccentrically mounted cam roller in rotation about a vertical axis, and said cam roller is received in the oblong cavity such that the rotation of the cam roller causes the transverse back-and-forth movement of said support plate and the vibration inducement in the cutter(s) which it supports;

the support plate has on its upper face at least one roller of which the head is rotatable about a vertical axis perpendicular to the direction of travel of said profiled element, said vibration-inducing means comprise a fixed supporting plate, secured to said frame, mounted above said support plate and supporting an actuator, said actuator comprises a motor which drives a profiled cam in rotation about a vertical axis, and said roller(s) cooperate with the profile of said cam such that the rotation of the cam causes the transverse back-and-forth movement of said support plate and the vibration inducement in the cutter(s) which it supports;

the means for adjustment of the height position of all the cutters comprises two lateral positioning plates, each positioning plate being mounted in a sliding and height-adjustable manner with respect to a cheek of the frame, the supporting plate is fastened at each of its two ends to one of the two positioning plates, and the lower end of each of the spring blades supporting the support plate is fastened to one of the two positioning plates;

the cutter(s) are driven to vibrate at a frequency between 200 Hz and 500 Hz;

said cutter comprises a single U-shaped blade of which the bottom, intended to cut the bottom of the groove, is arranged parallel to the plane of said profiled element, and of which the two lateral branches, intended to cut the flanks of the groove, are vertical or flared from the bottom of the U towards the top of the U;

said cutter comprises a pair of respectively right and left blades, each blade having the shape of an L of which the small branch, intended to cut at least one part of the bottom of the groove, is arranged parallel to the plane of the tyre tread and of which the large branch, intended to cut one of the flanks of the groove, is vertical or flared outwards and upwards, the two right and left blades of one and the same pair being fastened behind one another on a support plate of the cutting assembly in the direction of travel of said profiled element, in such a way that the cuts formed by their respective small branches in the profiled element overlap at least partially;

the cutting assembly comprises a support plate arranged horizontally opposite the upper face of said profiled element, this support plate comprises one or two transverse slots perpendicular to the direction of travel of said profiled element, each blade of a cutter is fastened to a support block, and each support block is fastened to said support plate by means of a screw which passes through the slot(s), the screw and the transverse slot(s) constituting said means for adjustment of the transverse position of said cutter(s);

said frame comprises two parallel cheeks spaced apart from one another, said travel means comprise a support roller and two application rollers, termed "upstream" roller and "downstream" roller, of smaller diameter than the support roller, said support roller is mounted rotatably between the two cheeks about an axis of rotation (Y-Y') perpendicular to the direction of travel (X-X') of said profiled element and is arranged below said cutting assembly, and the two application rollers are also mounted rotatably between the two cheeks about respective axes of rotation (Y1-Y'1; Y2-Y'2) parallel to the axis of rotation (Y-Y') of the support roller, the two upstream and downstream application rollers being arranged on either side of said support roller in such a way as to cooperate therewith to clamp the profiled element and press it against an angular portion of the outer surface of said support roller;

said support roller is driven in rotation by a motor;

said support roller comprises a means for laterally maintaining said profiled element on its outer surface, for example a vacuum suction device arranged inside said roller;

the support roller and/or at least one of the application rollers comprise/comprises a device for the thermal regulation of said profiled element.

The invention also relates to a method for cutting the profile of a tyre tread in a profiled element made of a raw rubber mixture and before cutting this profiled element into various sections intended for the fabrication of tyre treads of various tyres.

According to the invention, it comprises the steps consisting in:

manufacturing a profiled element with the aid of an extruder, cutting at least one longitudinal groove on the outer surface of said profiled element with the aid of the aforementioned device.

DESCRIPTION OF THE FIGURES

Other features and advantages of the invention will become apparent from the description which will now be given thereof, with reference to the appended drawings which, by way of non-limiting example, represent one possible embodiment thereof.

In these drawings:

FIG. 1 is a diagram representing a cross section of a profiled element of a tyre tread, FIG. 2 is a side view of the device for cutting the profile in a tyre tread profiled element according to the invention, FIG. 5 is a perspective detail view of a pair of blades of a cutter of the aforementioned device, FIG. 6 is an overall view of four pairs of blades of the device according to the invention, FIGS. 7A to 7C are perspective diagrams representing various embodiments of these cutting blades, FIG. 8 is a side view of a part of the actuator of the aforementioned device.

DETAILED DESCRIPTION OF THE INVENTION

The cutting device according to the invention will now be described in more detail in connection with FIGS. 2 and 3.

It makes it possible to cut the profile of a profiled element of a tyre tread made of a raw rubber mixture in order to form the longitudinal grooves S therein.

Figure 3:
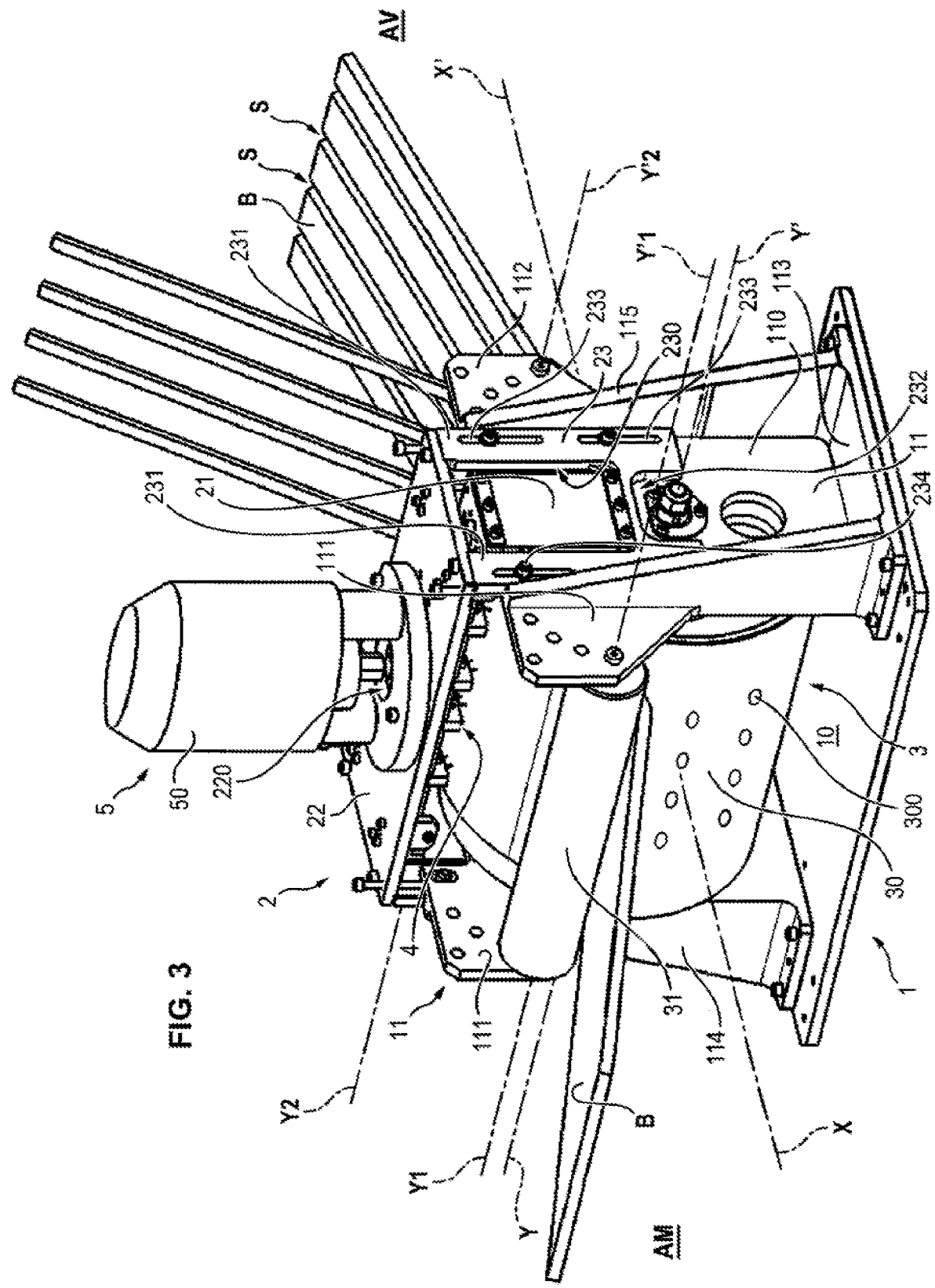
FIG. 3 is a perspective view of the device of FIG. 2.

As can be seen in FIG. 3, this tyre tread profiled element B preferably has a rectangular cross section which is much wider than it is thick. Although not represented in the figures, the lateral bevels of this profiled element B (visible only in FIG. 1) can, where appropriate, already have been formed.

The device according to the invention comprises, in a general manner, a frame 1, a cutting assembly 2 and travel means 3 for said tyre tread profiled element B, this profiled element being independent, that is to say not yet mounted on the outer surface of the tyre. The means 3 allow the profiled element to travel inside the device, in a direction of travel represented by the axis X-X', specifically in a direction of travel going from upstream AM to downstream AV.

An exemplary embodiment of this frame 1 will now be described.

The frame 1 comprises a flat pedestal 10 on which there are fastened two vertical lateral cheeks 11 which are parallel and spaced apart from one another.

Preferably, each cheek 11 has a central part 110 of rectangular shape which is extended at its upper part and on either side by an upstream lug 111 and a downstream lug 112.

The cheek 11 extends in a vertical plane parallel to the axis X-X'.

Each cheek 11 is extended at its lower part by a base 113 fastened by any suitable means on the pedestal 10. In addition, the cheek 11 advantageously has two upstream 114 and downstream 115 reinforcing legs of triangular shape which extend perpendicularly to the plane of the cheek 11.

This frame is advantageously made of metal.

The frame 1 could also have another shape.

Preferably, the travel means 3 comprise a support roller 30 and two upstream 31 and downstream 32 application (or lay-on) rollers, the roller 32 being visible only in FIG. 2.

The support roller 30 is of larger diameter than the two application rollers 31 and 32. The support roller 30 is mounted rotatably between the two lateral cheeks 11 about an axis of rotation Y-Y' perpendicular to the direction of travel X-X'.

Moreover, the upstream application roller 31 is mounted rotatably between the two upstream lugs 111 of the cheeks 11 about an axis of rotation Y1-Y'1 parallel to the axis Y-Y'.

In a similar manner, the downstream application roller 112 is mounted rotatably between the two downstream lugs 112 about an axis of rotation Y2-Y'2, likewise parallel to the axis of travel Y-Y'.

Preferably, the application rollers 31 and 32 are mounted as idle rollers. However, they could optionally be motorized.

As can be seen in FIG. 2, the application rollers 31 and 32 are arranged in such a way that their respective axes of rotation Y1-Y'1 and Y2-Y'2 are at a height greater than that of the axis of rotation Y-Y' of the support roller 30. The axes of rotation of these rollers 31, 32 thus form, with the axis of rotation Y-Y' of the support roller 30, a lay-on angle cc, preferably greater than 90°, which promotes the retention of the profiled element B on the roller 30.

The space between the outer surface of the application rollers 31 and 32 and the outer surface of the support roller 30 is also adapted so as to allow the passage between the two of the tyre tread profiled element B and the pressing and retention thereof on the support roller 30.

In an advantageous manner, a downstream belt (not represented in the figures) is arranged downstream of the device according to the invention. It is situated below the tyre tread profiled element in which the grooves S have been formed and it supports said profiled element on leaving the cutting device and drives it out of the device.

Although not represented either in the figures, it is also possible to provide an upstream belt to feed the tyre tread profiled element to the entry of the cutting device, that is to say between the upstream application roller 31 and the support roller 30.

In an advantageous manner, the support roller 30 can also be driven in rotation with the aid of a motor, which limits the tension of the tyre tread profiled element and its deformation.

In a likewise advantageous manner, guide rollers, which are not represented in the figures, can be provided on either side of the upstream application roller 31 and the downstream application roller 32 in order to avoid a lateral drift of the tyre tread profiled element B inside the cutting device.

Finally, in an advantageous manner, the support roller 30 can be provided with a device for laterally maintaining the tyre tread profiled element B. This device is, for example, a vacuum gripping system 300. In this case, the outer surface of the roller 30 is pierced with a plurality of orifices connected to a device placed inside the roller 30 and which makes it possible to create a negative pressure. The tyre tread profiled element B is thus pressed against the outer surface of the support roller 30.

Moreover, the support roller 30 and/or the application rollers 31, 32 can be provided with a thermal regulation device 7 which makes it possible, for example by circulating a refrigerating fluid inside said rollers, to avoid heating of the tyre tread profiled element B, which heating could result for example from the rubbing thereof between the rollers. Conversely, in the case where the material to be cut is excessively cold, it is also possible to envisage heating thereof by circulating a heating fluid inside the rollers 30, 31, 32.

Other embodiments of the travel means 3 could also be envisaged, using for example only conveyor belts on flat or non-flat ground (base), and not rollers.

An exemplary embodiment of a cutting assembly 2 will now be described in more detail in connection with FIGS. 2 and 4.

This cutting assembly 2 comprises a support plate 20 for at least one cutter 4 which serves to cut the grooves S.

Although not represented in the figures, additional cutters could be provided to cut the lateral bevelled flanks of the tyre tread profiled element.

This plate 20 has a rectangular shape; it is arranged transversely with respect to the frame 1 and above the highest region of the support roller 30.

Two spring blades 21 are respectively fastened to the two lateral ends of the support plate 20.

More precisely, the upper end 211 of each spring blade 21 is fastened (for example by screwing) to the lateral flanks of the support plate 20.

The cutting assembly 2 also comprises an actuator 5 which constitutes a means for inducing vibrations in the cutter(s) 4.

A supporting plate 22 (which appears more clearly in FIG. 3) supports this actuator 5. It is arranged above the support plate 20.

According to a first variant embodiment, which is not represented in the figures, the supporting plate 22 can be fastened directly to the upper part of the two cheeks 11 of the frame 1. In this case, the lower end 212 of each spring blade 21 is then also fastened to one of the cheeks 11.

However, according to a preferred variant of the invention represented in the figures, the cutting assembly 2 is height-adjustable.

In this case, the cutting assembly 2 also comprises two identical lateral positioning plates 23. Each positioning plate 23 substantially has the shape of an H provided in its upper part with a U-shaped cutout 230 which delimits two lateral branches 231. Preferably, each positioning plate 23 is arranged on the outer surface of the cheek 11 and between the two reinforcing legs 114, 115.

The two lateral ends of the supporting plate 22 are fastened, for example by screwing, respectively to the two upper ends of the branches 231 of the plate 23 (see FIG. 3).

The positioning plate 23 also comprises, at the centre of its lower part, a cutout 232 allowing the passage of the end of the axis Y-Y' of the supporting roller 30.

Moreover, the lower end 212 of the spring blade 21 is for its part fastened in the bottom of the U-shaped cutout 230, for example likewise by screwing.

The positioning plate 23 comprises, in each of its branches 231, at least one vertical adjustment slot 233, preferably two such slots, aligned vertically above one another.

Each cheek 1 is pierced with four threaded orifices, not visible in the figures, arranged opposite said slots 233.

A screw 234 of which the head is wider than the width of the slot 233 is introduced inside the threaded orifice, through said slot 233. By screwing four screws 234 into the four threaded orifices made in each cheek 11, it is thus possible to clamp and lock the positioning plate 23 at a given height. This height-locked position can be modified by simply unscrewing the screws 234, by vertically moving the positioning plate 23 to the desired new position and then by subsequently retightening the screws 234.

The vertical movement of the two positioning plates 23 ensures the movement of the supporting plate 22 and also the movement of the support plate 20, by movement of the lower end 212 of the spring blades 21. There is thus obtained the movement in terms of height of the cutter 4, or of all the cutters 4, mounted on the support plate 20.

The positioning plate 23 can also be moved in terms of height with the aid of other adjustment means, such as slide means, rack means, etc.

The actuator 5 comprises a motor, not visible in the figures, housed inside a casing 50, arranged and fastened on the upper face of the supporting plate 22. This motor, directly or via a step-up gear unit drives in rotation a vertical output shaft 51 of axis of rotation Z-Z', visible in FIG. 8 and perpendicular to the direction of travel X-X' and to the axis of rotation Y-Y' of the roller 30.

A cam roller 52 is mounted eccentrically at the lower free end of said motor shaft 51, such that its vertical central axis Z1-Z1 is eccentric with respect to the vertical axis of rotation Z-Z'.

Figure 4:
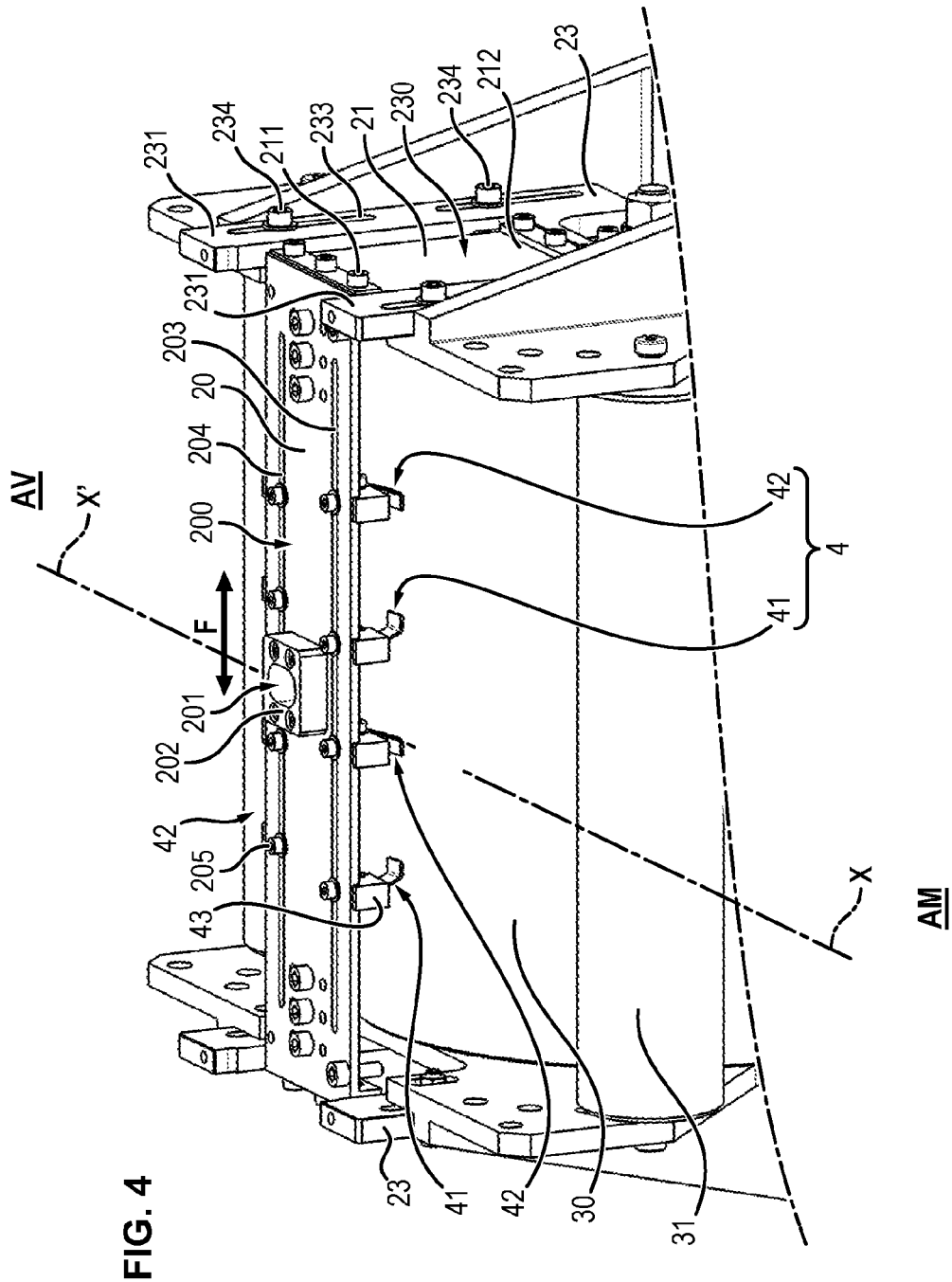
FIG. 4 is a detail view of a part of the device of FIGS. 2 and 3.

Moreover, as can be seen from FIG. 4, the support plate 20 has at its centre an oblong cavity 201 formed either directly in the thickness of the plate or in an add-on part 202 fastened, for example by screwing, to the upper face 200 of the plate 20. This oblong cavity extends along an axis parallel to the axis of travel X-X'.

The supporting plate 22 is pierced with a central orifice 220, through which the rotary shaft 51 passes, and the cam roller 52 is positioned inside said oblong cavity 201.

The cam roller 52 and the oblong cavity 202 are dimensioned in such a way that the rotary movement of the shaft 51 causes the transverse movement to the right and to the left of the support plate 20 (see double arrow F). This back-and-forth movement to the left and to the right is made possible by the flexibility of the spring blades 21.

These blades 21 are advantageously made of metal, preferably of steel (of spring steel type 45 SCD6 for example with a mechanical strength Rm of between 900 MPa and 2000 MPa depending on the tempering temperature). In an advantageous manner, they have a yield strength of at least 600 MPa and a tensile strength greater than 800 MPa.

The motor of the actuator 5 is driven in rotation over a range of speeds which makes it possible to obtain a vibration frequency of the plate 20, and thus of the cutters 4, of preferably between 200 Hz and 500 Hz. Inducing vibration in the cutters 4 facilitates the cutting of the grooves S in the tyre tread profiled element.

Other means for inducing vibration in the cutters could be used.

Figure 9:
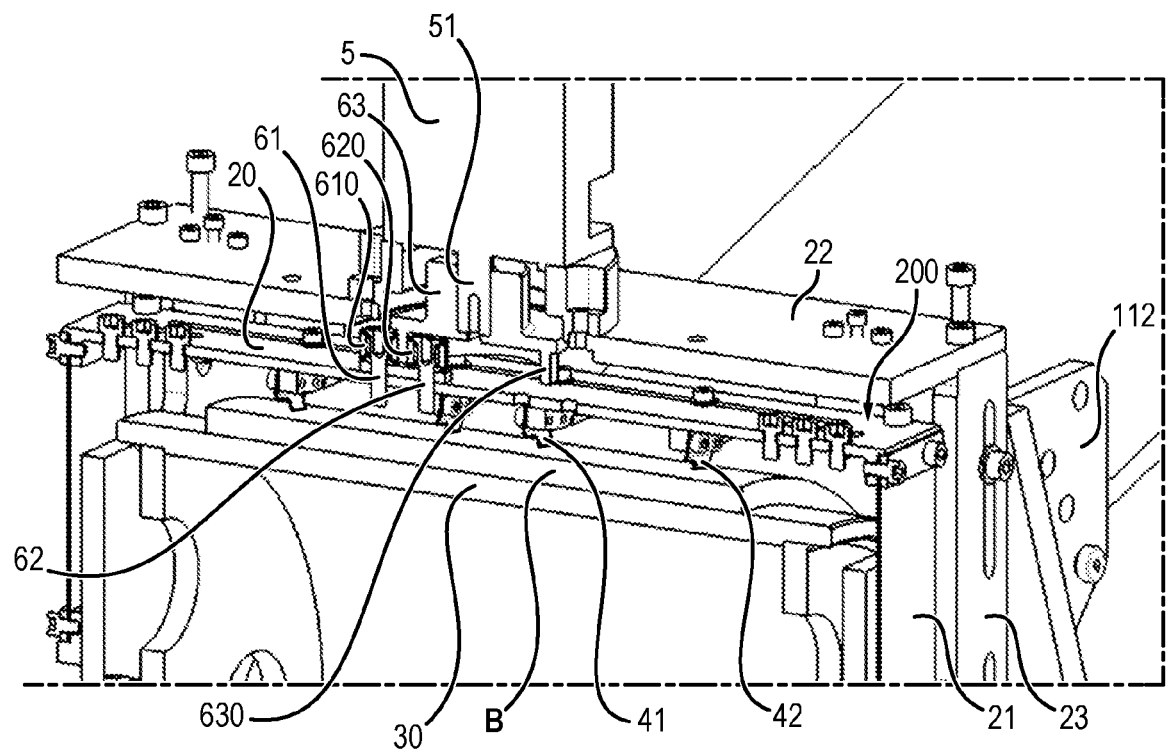
FIG. 9 is a perspective view of a part of a device for cutting a profile in a profiled element of a tyre tread according to a variant embodiment.

Another of these means is represented in FIG. 9. Elements identical to those represented in FIGS. 2 to 4 bear the same reference numbers.

The support plate 20 supports two rollers 61, 62 of which the heads 610, 620 project from its upper face 200 and are mounted rotatably about a central axis.

A profiled cam 63 is coupled in rotation with the end of the vertical output shaft 51 of the motor of the actuator 5.

Figure 10:
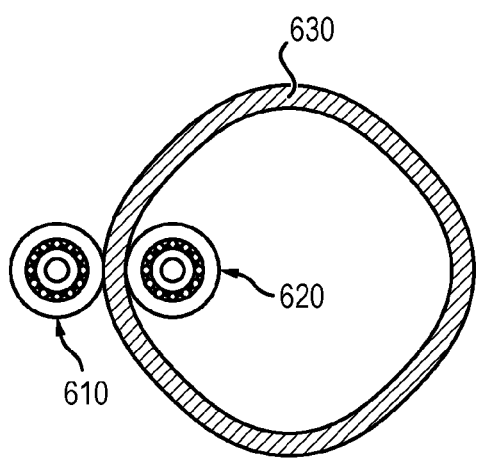
FIGS. 10 and 11 are detail views of two variant embodiments of a cam of the device of FIG. 9.

This cam 63 has at its lower part a ring 630 having the shape of a square with rounded corners (see FIG. 10). The two heads 610, 620 of the rollers bear respectively on the outer face and the inner face of this ring 630.

The rotation of the cam 63 causes four sinusoidal oscillations, thus multiplying the rotational frequency of the motor by four. Specifically, for one motor revolution, the cutting assembly 2 performs four back-and-forth movements. Thus, for example, to have a frequency of 200 Hz, the motor needs to turn only at 50 Hz, that is to say 3000 rev/min.

Figure 11:
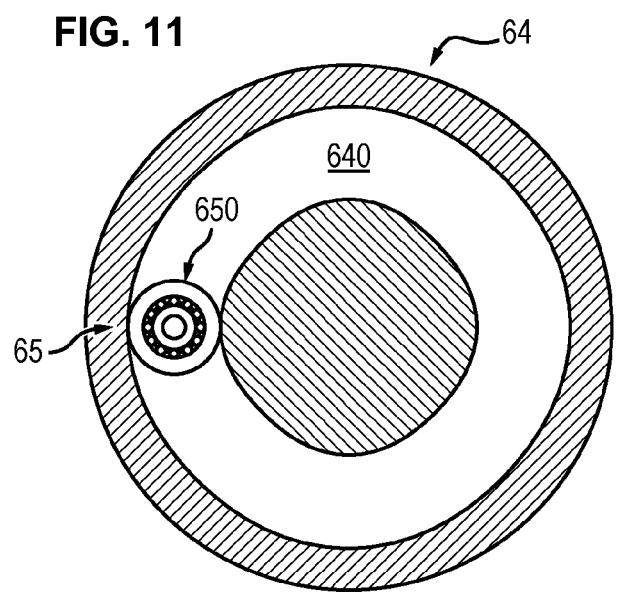

A similar solution represented in FIG. 11 consists in using a single roller 65 which is secured to the plate 20 and of which the rotatable head 650 moves in a profiled groove 640 of a cam 64, driven in rotation by the shaft 51. A clearance is necessary for the roller to be able to move in this groove. The groove has the shape of a square with rounded corners.

In an advantageous manner, travel stops (not represented in the figures) can be fastened below the lower face of the supporting plate 22 so as to prevent the movement of the support plate 20 in the direction X-X' and also along the vertical axis Z-Z', so as to avoid any vertical "hopping" of the cutters 4.

The cutters 4 are fastened below the surface of the support plate 20 in a manner which will be described later.

The cutters 4 can take two forms.

According to a first embodiment represented in FIG. 5, the cutter 4 comprises a pair of blades 41, 42 which jointly make it possible to cut a groove S.

According to another variant embodiment not represented in the figures, the cutter 4 can be composed of a single blade of which the contour corresponds to that of the groove to be cut.

The blades of the cutters are advantageously made of steel.

It can be seen from FIG. 5 that each left 41 and right 42 blade of a pair has the general shape of an L, the respective small branch 410 and 420 of which allows the cutting of the bottom of the groove, and the respective large branch 411 and 421 of which allows the cutting of the respective left and right flank of the groove S.

Preferably, the respective large branches 411 and 421 are upwardly and outwardly inclined from the respective small branch 410 and 420. However, it will be noted that the large branches 411, 421 could also have a right angle to the small branches 410, 420.

Each blade 41, 42 has a respective L-shaped leading edge (cutting edge) 412, 422 oriented towards the upstream side of the cutting device. The same is true when the cutter is formed by a single blade.

For a given pair of blades, it will be noted that the left 41 and right 42 blades are arranged successively behind one another and on either side of a median vertical plane P, visible in FIG. 6, which also passes through the centre of the bottom of the groove S. The blades 41 and 42 are arranged in such a way that their small branches 410, 420 cover groove bottom cutting regions which overlap at least partially.

When it is necessary to produce a plurality of grooves in the tyre tread profiled element B, for example four grooves in the example represented in FIG. 6, it will be noted that, in an advantageous manner, the left blades 41 of the first and of the third pairs of blades are for example arranged towards the upstream side whereas the right blades 42 of these same pairs are arranged towards the downstream sides and that, conversely, for the second and the fourth pairs of blades, it is by contrast the right blades 42 which are arranged towards the upstream side whereas the left blades 41 of these same pairs are arranged towards the downstream side. This makes it possible to avoid tensions or deformations in the tyre tread profiled element during the travel thereof.

In an advantageous manner, and as can be seen in FIG. 4, the transverse portion of each blade and of each pair of blades with respect to the support plate 20 is adjustable.

To this end, it will be noted that each respective left 41 and right 42 blade is mounted on a support block 43 of which the upper face is pierced with a tapped orifice, which is not visible in the figures.

Moreover, the support plate 20 comprises two parallel transverse slots, namely an upstream slot 203 and a downstream slot 204.

A screw 205 of which the head is wider than the width of the slots 203, 204 can be inserted into the tapped orifice of the support block 43, with the result that the screw body passes through the slot 203 or the slot 204.

It will be readily understood that, by screwing the screw 205 through the slot 203 or 204, it is possible to immobilize the support block 43 with respect to the plate 20 and that, conversely, by unscrewing the screw 205, it is possible to cause the block 43 to slide towards the right or towards the left along the slots 203, 204.

For one and the same pair of blades 41, 42, it is thus possible to position the left 41 and right 42 blades in such a way that they are spaced apart from one another to a greater or lesser extent, thus making it possible to obtain a groove S of greater or lesser width.

Thus, in FIG. 6, it will be noted that the left 41 and right 42 blades are arranged in such a way that their respective small branches 410, 420 are situated behind one another, which makes it possible to obtain a narrow groove.

Conversely, in FIG. 5, it will be noted that the left 41 and right 42 blades are spaced apart further from one another, with the result that the groove obtained is wider.

Moreover, the same device of slots 203, 204 and of screws 205 makes it possible to position each pair of blades at a given point of the support plate 20 so as to define the transverse position of the various grooves on the tyre tread profiled element B.

When the cutter 4 is formed by a single blade, the latter advantageously has the shape of a U of which the bottom is flat and of which the two lateral branches are preferably flared outwards. In this case, the support plate 20 comprises a single transverse slot and only the transverse position of the cutter with respect to the support plate 20, and thus to the tyre tread profiled element, can be modified. The width of the groove obtained is fixed and dependent on the shape of the single blade.

Other transverse positioning means for the cutters 4 are also conceivable, such as slide systems. In addition, the above-described transverse positioning of the cutters is manual. It could also be motorized and automated as required, that is to say by a control of the actuators via a computer program providing the correct process parameters for achieving cutting in an optimal manner.

Whether the cutter has one or two blades, its leading edge can have various shapes, three exemplary embodiments of which are represented in FIGS. 7A to 7C.

In these figures, the right blades 42 are represented as seen in perspective.

In the variant embodiment of FIG. 7A, the leading edge 422 is formed by a double bevel of which the projecting median edge is oriented towards the left of the figure (towards the upstream side).

In FIG. 7B, the leading edge 422 is a single bevel which extends from the upstream side AM towards the downstream side AV in the direction of the inner face of this branch 421.

Conversely, in the embodiment of FIG. 7C, the leading edge 422 has a single bevel which extends from the upstream side AM towards the downstream side AV in the direction of the outer face of this large branch 421.

The choice of the shape of this leading edge will depend on the nature of the material constituting the tyre tread profiled element B.

Preferably, and as can be seen in FIG. 2, the leading edges 422 of the various right blades 42 are aligned in a radial plane P1 and/or P2 to the support roller 30. Likewise, the leading edges 412 of the left blades 41 are aligned in a radial plane P1 and/or P2 to the support roller 30. To achieve this, the blades 41, 42 are fastened with respect to the support block 43 so as to be slightly inclined. This fastening is obtained for example with the aid of two screws 44.

Preferably, two right blades 42 and two left blades 41 are aligned in a first radial plane P1, and two other right blades 42 and two other left blades 41 are aligned in a second radial plane P2 separate from the first plane.

Finally, in an advantageous manner, and although not represented in the figures, it is also possible to provide a device for the individual height adjustment for each left 41 or right 42 blade with respect to the support block 43, thereby making it possible to obtain grooves S of different depth on one and the same tyre tread profiled element. Each blade 41, 42 can for example be mounted so as to be vertically slideable with respect to the block 43.

The invention claimed is:

1. A device for cutting a profile of a tire tread in a profiled element made of a raw rubber mixture, the device comprising:
a frame supporting a cutting assembly; and
travel means configured to move the profiled element through the cutting assembly,
wherein the cutting assembly comprises at least one cutter for cutting a longitudinal groove in an outer face of the profiled element and vibration-inducing means for inducing vibration in the at least one cutter in a transverse direction perpendicular to a direction of movement of the profiled element, and
wherein the cutting assembly further comprises a support plate below which the at least one cutter is fixed, the support plate being arranged horizontally or in a tangent plane opposite the outer face of the profiled element in such a way that the at least one cutter can cut the longitudinal groove therein, and being mounted at its two lateral ends on two vertical lateral spring blades, each spring blade having a lower end fastened to the frame and an upper end fastened to the support plate in such a way that the support plate can move back and forth in a transverse direction perpendicular to the direction of movement of the profiled element under action of the vibration-inducing means.

2. The device according to claim 1, wherein the cutting assembly further comprises at least one among: height position adjustment means for the at least one cutter, height position adjustment means for all cutters simultaneously, and transverse position adjustment means for the at least one cutter with respect to the direction of movement of the profiled element.

3. The device according to claim 2, wherein the support plate of the cutting assembly is arranged horizontally opposite an outer face of the profiled element,
wherein the support plate comprises at least one transverse slot perpendicular to a direction of movement of the profiled element,
wherein the at least one cutter comprises at least one blade,
wherein the at least one blade of the at least one cutter is fastened to a support block, and
wherein the support block is fastened to the support plate by a screw which passes through the at least one transverse slot, the screw and the at least one transverse slot constituting the transverse position adjustment means for the at least one cutter.

4. The device according to claim 1, wherein the support plate has on its upper face an oblong cavity extending in the direction of movement of the profiled element,
wherein the vibration-inducing means comprise a fixed supporting plate, secured to the frame, mounted above the support plate, and supporting an actuator,
wherein the actuator comprises a motor which drives an eccentrically mounted cam roller in rotation about a vertical axis, and
wherein the eccentrically mounted cam roller is received in the oblong cavity such that a rotation of the eccentrically mounted cam roller causes a transverse back-and-forth movement of the support plate and induces vibration in the at least one cutter.

5. The device according to claim 1, wherein the support plate has on its upper face at least one roller of which a head is rotatable about a vertical axis perpendicular to the direction of movement of the profiled element,
wherein the vibration-inducing means comprise a fixed supporting plate, secured to the frame, mounted above the support plate, and supporting an actuator,
wherein the actuator comprises a motor which drives a profiled cam in rotation about a vertical axis, and
wherein the at least one roller cooperates with a profile of the profiled cam such that a rotation of the profiled cam causes a transverse back-and-forth movement of the support plate and induces vibration in the at least one cutter.

6. The device according to claim 1, wherein the cutting assembly further comprises at least one among: height position adjustment means for the at least one cutter and transverse position adjustment means for the at least one cutter with respect to the direction of movement of the profiled element,
wherein the height position adjustment means comprises two lateral positioning plates, each positioning plate being mounted in a sliding and height-adjustable manner with respect to a cheek of the frame,
wherein the fixed supporting plate is fastened at each of its two ends to one of the two lateral positioning plates, and
wherein a lower end of each of the two vertical lateral spring blades supporting the support plate is fastened to one of the two lateral positioning plates.

7. The device according to claim 1, wherein vibration induced in the at least one cutter is at a frequency between 200 Hz and 500 Hz.

8. The device according to claim 1, wherein the at least one cutter comprises a single U-shaped blade, the single U-shaped blade having a bottom, a top part opposite the bottom and two lateral branches,
wherein the bottom is intended to cut a bottom of the longitudinal groove and is arranged parallel to a plane of the profiled element, and
wherein the two lateral branches are intended to cut flanks of the longitudinal groove and are vertical or flared from the bottom of the U-shaped blade toward the top part of the U-shaped blade.

9. The device according to claim 1, wherein the at least one cutter comprises a pair of right and left blades, each blade having an L shape with a small branch and a large branch, wherein the small branch is intended to cut at least one part of a bottom of the longitudinal groove and is arranged parallel to a plane of the profiled element, and wherein the large branch is intended to cut one of two flanks of the longitudinal groove, is vertical or flared outward and upward, the pair of right and left blades being fastened behind one another on a support plate of the cutting assembly in a direction of movement of the profiled element, in such a way that cuts formed in the profiled element by their respective small branches overlap at least partially.

10. The device according to claim 1, wherein the frame comprises two parallel cheeks spaced apart from one another, wherein the travel means comprise a support roller and two application rollers, the two application rollers being an upstream roller and a downstream roller, each of a smaller diameter than the support roller, wherein the support roller is mounted rotatably between the two parallel cheeks about an axis of rotation perpendicular to a direction of movement of the profiled element and is arranged below the cutting assembly, and wherein the two application rollers are also mounted rotatably between the two parallel cheeks about respective axes of rotation parallel to an axis of rotation of the support roller, the two application rollers being arranged on either side of the support roller in such a way as to cooperate therewith to clamp the profiled element and press the profiled element against an angular portion of an outer surface of the support roller.

11. The device according to claim 10, wherein the support roller is driven in rotation by a motor.

12. The device according to claim 10, wherein the support roller comprises means for laterally maintaining the profiled element on its outer surface.

13. The device according to claim 12, wherein the means for laterally maintaining the profiled element is a vacuum gripping device arranged inside the support roller.

14. The device according to claim 10, wherein the support roller, at least one of the two application rollers, or both the support roller and at least one of the two application rollers comprise a device for thermal regulation of the profiled element.

15. A method for cutting a profile of a tire tread in a profiled element made of a raw rubber mixture, the method comprising, before cutting the profiled element into various sections intended for the fabrication of tire treads of various tires, the steps of:

manufacturing a profiled element using an extruder; and cutting at least one longitudinal groove on an outer surface of the profiled element using the device according to claim 1.

* * * * *